United States Patent [19]

Papst

[11] 4,207,779
[45] Jun. 17, 1980

[54] CONNECTING ROD FOR AXIAL CYLINDER-TYPE RECIPROCATING PISTON ENGINE

[76] Inventor: Hermann Papst, D-7742 St. Georgen, Schwarzwald, Fed. Rep. of Germany

[21] Appl. No.: 874,501

[22] Filed: Feb. 2, 1978

[30] Foreign Application Priority Data

Feb. 2, 1977 [DE] Fed. Rep. of Germany ....... 2704150
Sep. 6, 1977 [DE] Fed. Rep. of Germany ...... 2740006

[51] Int. Cl.² .......................... G05G 1/00; F16J 1/14; F02B 75/32
[52] U.S. Cl. .................... 74/579 R; 74/60; 74/579 E; 91/499; 92/187; 92/190; 123/58 B; 123/197 AB
[58] Field of Search .................. 74/579 R, 579 E, 60; 123/58 B, 197 AB, 197 AC, 90.61; 92/187, 190, 70, 71, 57; 91/499

[56] References Cited

U.S. PATENT DOCUMENTS

| | | | |
|---|---|---|---|
| 1,680,917 | 8/1928 | Sloan | 92/188 |
| 2,097,138 | 10/1937 | Steele | 123/58 B X |
| 3,066,658 | 12/1962 | Gondek | 74/579 R X |
| 3,431,796 | 3/1969 | Valbjorn | 74/579 E |
| 3,468,007 | 9/1969 | Nakamura | 74/579 R X |
| 3,538,574 | 11/1970 | Toma et al. | 74/579 E X |
| 3,678,807 | 7/1972 | Papst | 92/70 |

FOREIGN PATENT DOCUMENTS

| | | | |
|---|---|---|---|
| 215217 | 10/1960 | Fed. Rep. of Germany | 74/579 E |
| 2607104 | 9/1976 | Fed. Rep. of Germany | 123/58 B |
| 119542 | 10/1918 | United Kingdom | 74/579 E |

OTHER PUBLICATIONS

"Engines Having the Cylinders Parallel to the Shaft", E. S. Hall, FIG. 2 (1913), FIG. 6 (1905), FIGS. 12 and 15 (1935).

Primary Examiner—Samuel Scott
Assistant Examiner—Daniel J. O'Connor
Attorney, Agent, or Firm—Craig & Antonelli

[57] ABSTRACT

A connecting rod for reciprocating piston engines, especially axial cylinder-type reciprocating piston engines, with the connecting rod including a tubular shaft having hollow spherical shells mounted at the ends thereof. The tubular shaft and the hollow spherical shells are constructed from a sheet metal-like material and are joined to form a one-piece connecting rod body by way of welding joints. A lubricating tube is arranged within the tubular shaft and extends between the spherical shells so as to equalize the lubricant between surfaces of the hollow spherical shells.

14 Claims, 18 Drawing Figures

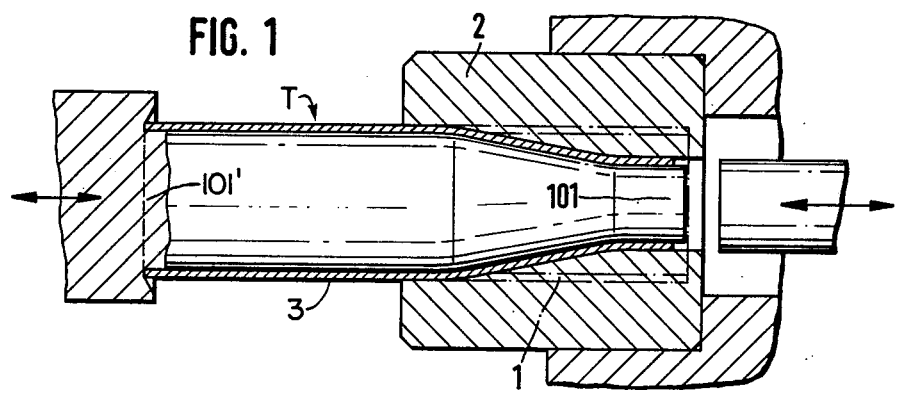
FIG. 1
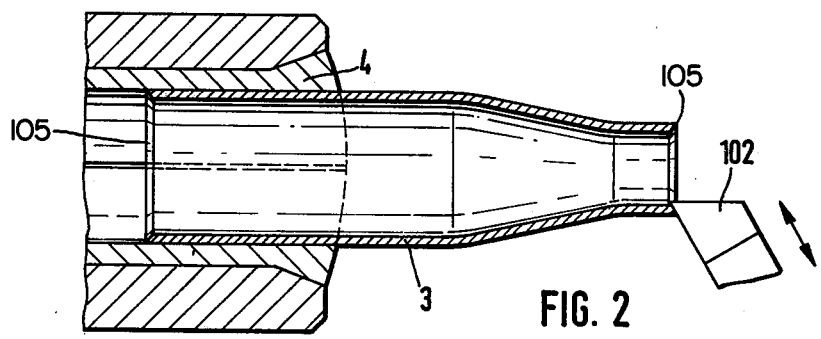
FIG. 2
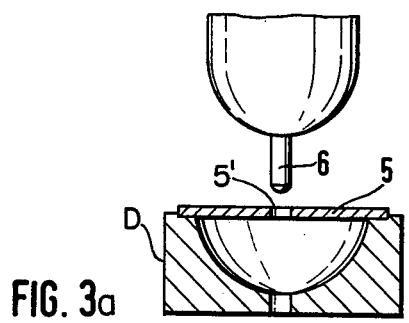
FIG. 3a
FIG. 3b
FIG. 3c
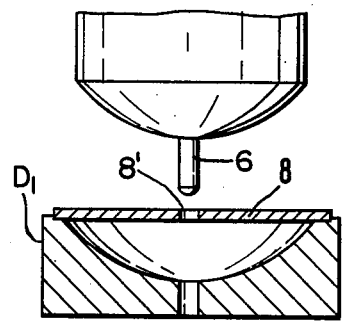
FIG. 4a
FIG. 4b
FIG. 4c

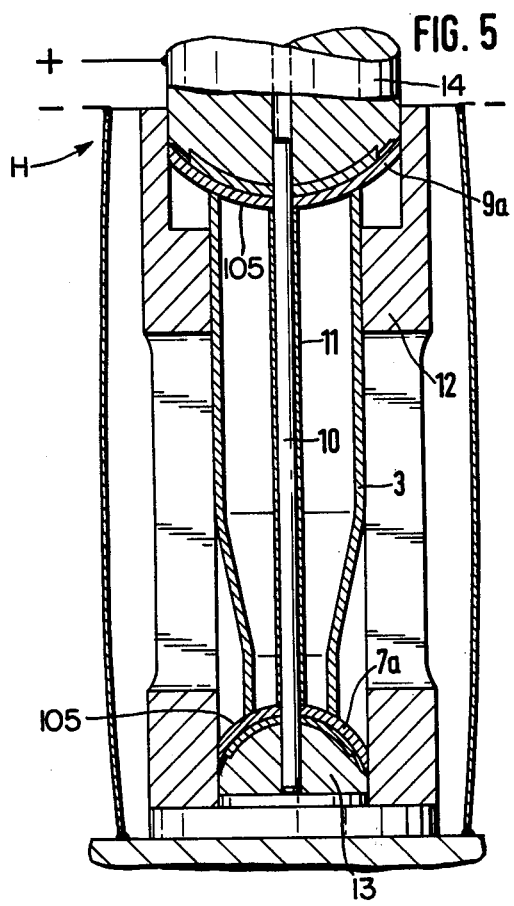
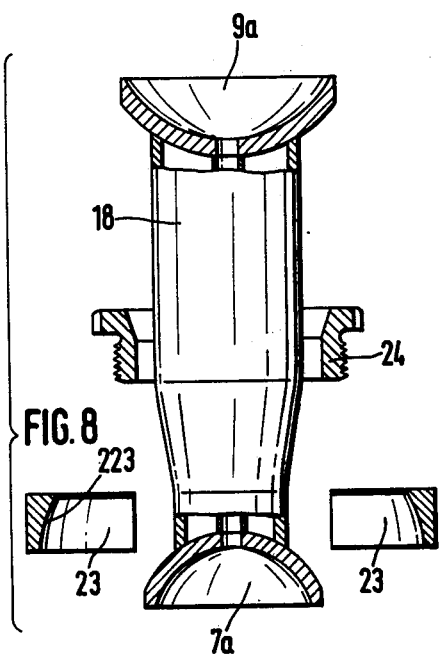
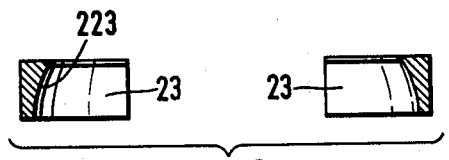
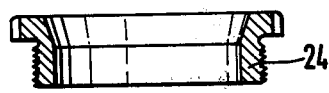
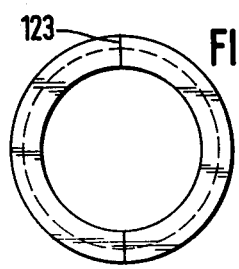
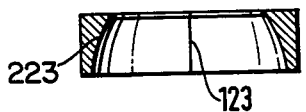

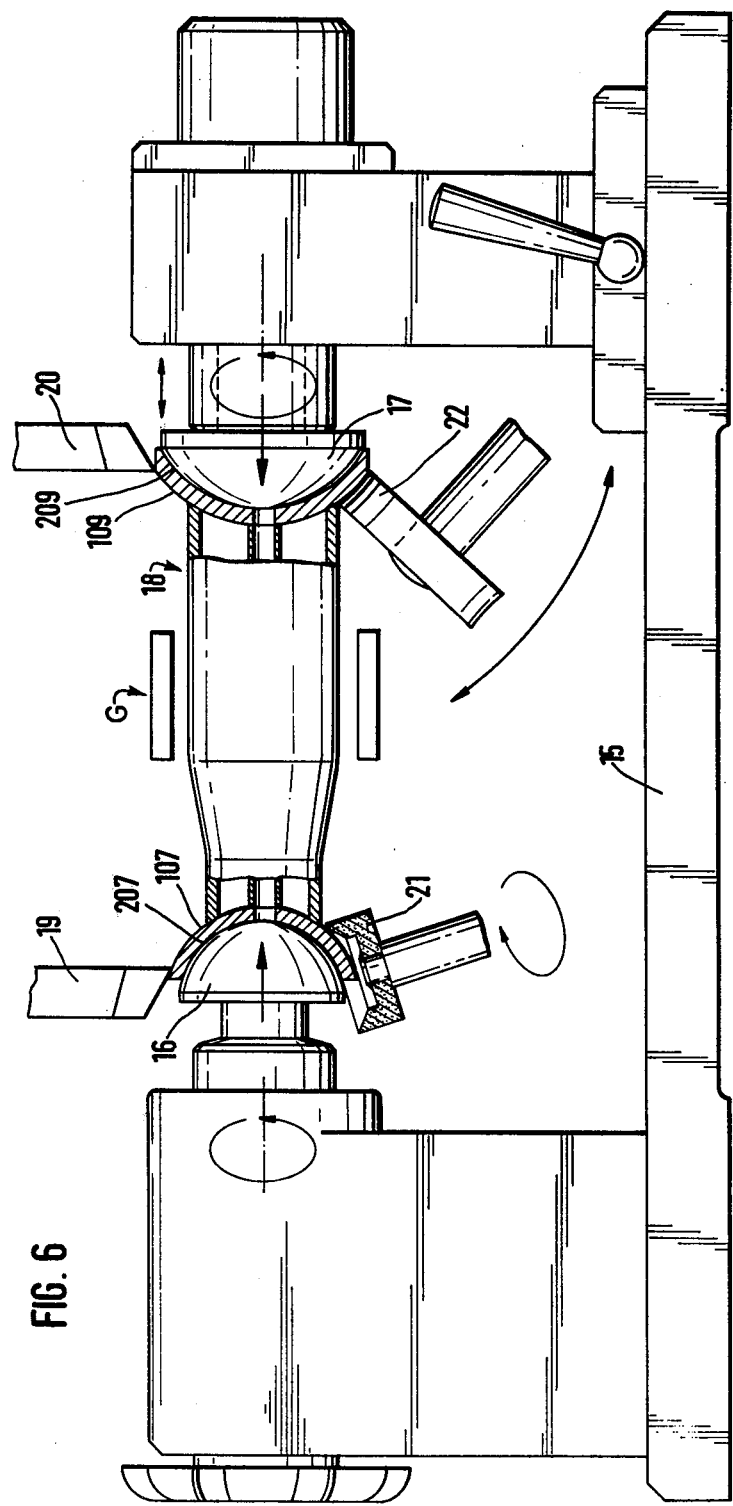

CONNECTING ROD FOR AXIAL CYLINDER-TYPE RECIPROCATING PISTON ENGINE

The present invention relates to a reciprocating piston engine construction and, more particularly, to a connecting rod for an axial cylinder-type reciprocating piston engine of the type disclosed, for example, in German patent application No. P 27 04 150.5, corresponding to U. S. application Ser. No. 874,462, now abandoned, the disclosure of which is incorporated herein by reference to the extent necessary in understanding the present invention.

Connecting rods having hollow spherical bearing surfaces at ends thereof have been proposed, for example, in German Pat. No. 922,387. However, several disadvantages and difficulties are encountered during the manufacture of these proposed connecting rods from a single piece of material, thereby rendering the proposed connecting rods too expensive for economical useage in axial cylinder-type internal combustion engines having a rather large number of pistons. In particular, the proposed connecting rods had to be provided with deep conical bores in the shaft of the connecting rods to reduce their weight, which thereby impaired the bearing surface of the connecting rod in the piston of the engine.

The aim underlying the present invention essentially resides in providing a dimensionally stable connecting rod of a minimum mass which exhibits a high performance strength and which nevertheless can be manufactured from an inexpensive material by means of mass production.

According to one advantageous feature of the present invention, the connecting rods are each constructed as one-piece tubular shafts provided at each end with hollow spherical shells with the shells being fashioned from sheet metal-like parts and joined to the one-piece tubular shafts forming the connecting rod body by way of welding joints.

Preferably, according to the present invention, the hollow spherical shells are formed from planar sheet metal disks which are joined along their outer surfaces to the ends of the tubular shaft by a welding operation which may be, for example, a short-term welding process.

According to the present invention, the tubular shaft is suitably made of welded steel pipe which has been subjected to a non-cutting shaping operation such as, for example, being subjected to a re-drawing process in order to obtain higher strength with the tubular shaft being simultaneously adapted to varying diameters of the hollow spherical shells or additionally adapted by narrowing or reducing one of the ends of the tubular shaft by means of tightening or clamping.

In a short-term welding process, the welding energy is obtained from appropriately charged capacitors as a current pulse of up to 100,000 amperes over a period of micro-seconds. The decisive point is that the energy is passed on to the welding joint as intact as possible. The connecting rod construction of the present invention is well suited for a manufacturing process utilizing short-term welding due to the features thereof since the rotationally symmetrical shape of the connecting rods of the present invention favor a coaxial supply and discharge of a welding current pulse.

According to the present invention, the hollow spherical bearing surfaces in the piston are selected to be essentially larger than those of a big end of the connecting rod in the wobble ring because the circular motions of the cooperating bearing surfaces are smaller at that point than at the big end of the connecting rod where these bearing surfaces execute larger mutual rotations on a respectively common spherical surface.

According to a further feature of the present invention, the two spherical shell inner surfaces are connected with each other by way of a narrow lubricating tube which is disposed coaxially with respect to the shaft of the connecting rod and is sealed or joined at the outer surfaces of the spherical shell. By virtue of this arrangement, fluctuations in the amount of oil entering the cavity of the connecting rod during the operation of the engine which would considerably disturb the mass balance of the engine are prevented. As readily apparent, the effect of this latter feature is not limited to a connecting rod specifically fashioned in accordance with the present invention, but also has application in, for example, other connecting rod constructions.

The constructional features of the present invention have proven astonishingly effective in diesel engines with an axial cylinder-type engine with five or six cylinders distributed about the axis and with a compression ratio of 1:22, operating with compression ignition without the aid of spark plugs as well as in a simulator.

According to yet another feature of the present invention, the spherical shells provided at the respective ends of the tubular shaft of the connecting rod and corresponding bearing cups provided in the piston and wobble ring have spherical surfaces which respectively slide along each other with the spherical surfaces having slightly differing radii of curvature to form wedge-shaped oil grooves.

Preferably, at least the working surface portions of the connecting rod of the present invention are temper-hardened.

However, it is also possible in accordance with the present invention to provide working surfaces on the connecting rod with wear-proof hard metal layers.

Additionally, according to the present invention, the working surfaces of the connecting rod may be provided with chromium and, preferably, a coating of non-porous ductile chromium.

In accordance with yet another feature of the present invention, the circularly punched planar sheet metal plates which represent the starting material for the respective spherical shells are preliminarily machined by parallel grinding in order to obtain a uniform thickness.

Additionally, during the manufacture of the connecting rod in accordance with the present invention, the connecting rod is treated to a concentric grinding, rolling and/or erosion treatment of the spherical shell surfaces.

Moreover, to effect a machining of the connecting rod of the present invention, the spherical shells are clamped or mounted between appropriately shaped spindle heads of a lathe so as to frictionally entrain the connecting rod, thereby permitting machining of the same.

According to a still further feature of the present invention, a wear-proof coating is applied to the working surfaces of the connecting rod by a chemical and, preferably, an electrolytic treatment.

Accordingly, it is an object of the present invention to provide a connecting rod arrangement for an axial cylinder-type reciprocating piston engine which avoids, by simple means, the drawbacks and disadvantages encountered in the prior art.

Another object of the present invention resides in providing a connecting rod arrangement for an axial cylinder-type reciprocating piston engine which exhibits a high performance strength, but which may be manufactured from an inexpensive material.

Yet another object of the present invention resides in providing a connecting rod arrangement for an axial cylinder-type reciprocating piston engine which can be manufactured by mass production techniques.

An additional object of the present invention resides in providing a connecting rod arrangement for an axial cylinder-type reciprocating piston engine which is suitable for a two-stroke operation.

A further object of the present invention resides in providing a connecting rod arrangement for an axial cylinder-type reciprocating piston engine which permits manufacturing of internal combustion engines of five, six or twelve pistons, which engines no longer develop any negative torques and exhibit merely a fraction of the peak loads occurring in conventional known piston engines with a crankshaft drive, thereby rendering the engines more accessible to widespread use.

A still further object of the present invention resides in providing a connecting rod for an axial cylinder-type reciprocating piston engine which functions reliably under all operating conditions.

Another object of the present invention resides in providing a connecting rod for an axial cylinder-type reciprocating piston engine which may be constructed in a simple manner, thereby minimizing overall manufacturing costs.

These and other objects, features and advantages of the present invention will become more apparent from the following description when taken in connection with the accompanying drawings which slow, for the purposes of illustration only, several embodiments in accordance with the present invention, and wherein:

FIG. 1 is a partial cross-sectional view of an initial manufacturing operation of a connecting rod arrangement in accordance with the present invention;

FIG. 2 is a partial cross-sectional view of a machining operation of the connecting rod arrangement of FIG. 1;

FIGS. 3a-3c are cross-sectional views of manufacturing steps of a first spherical shell for mounting on the connecting rod arrangement in accordance with the present invention;

FIGS. 4a-4c are cross-sectional views of manufacturing steps of a second spherical shell for mounting on the connecting rod arrangement in accordance with the present invention;

FIG. 5 is a cross-sectional view of an assembled connecting rod arrangement arranged in a welding device for welding the individual members into one piece in a single operating cycle;

FIG. 6 is a partially schematic view of a machining arrangement for machining the connecting rod arrangement in accordance with the present invention;

FIG. 8 is an exploded partial cross-sectional view of a connecting rod arrangement in accordance with the present invention having a threaded ring gear arranged thereon;

FIG. 9 is an exploded view of an external bearing ring employed in the connecting rod arrangement in accordance with the present invention;

FIG. 9a is a cross-sectional view of a complete external bearing ring;

FIG. 9b is a top view of the bearing ring of FIG. 9a;

FIG. 10 is a cross-sectional view of a threaded ring employed in the connecting rod arrangement in accordance with the present invention.

Figure 7:
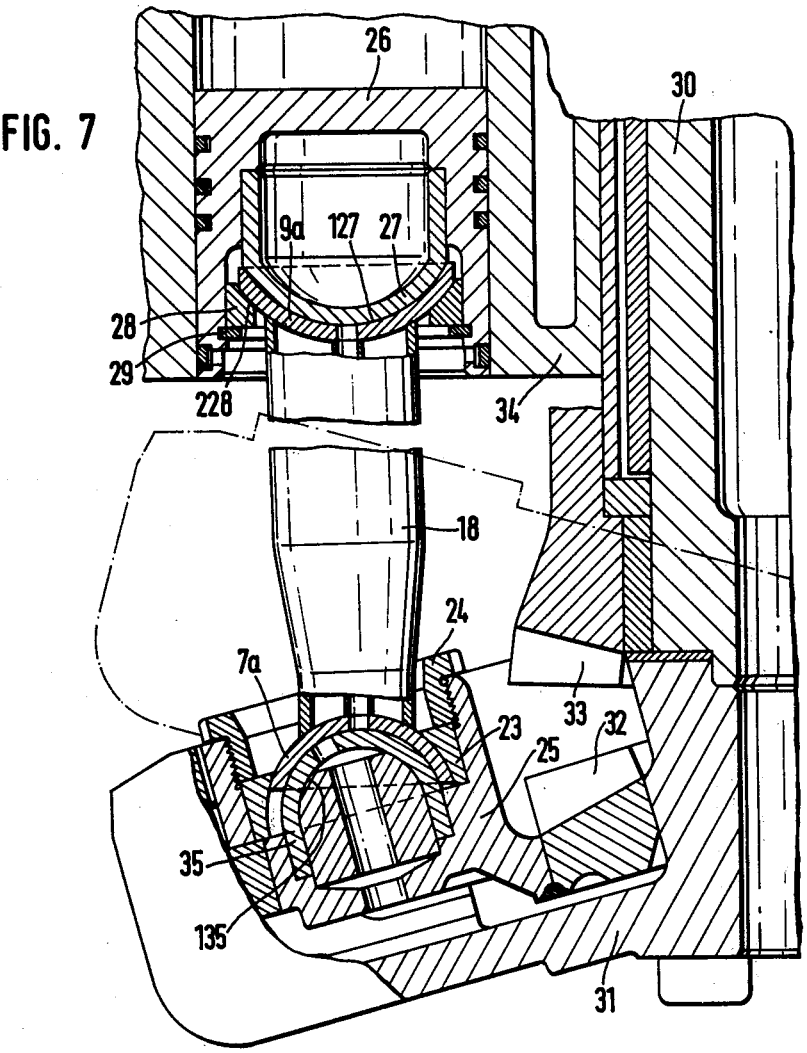
FIG. 7 is a longitudinal partial cross-sectional view through a center of a cylinder of an axial cylinder-type reciprocating piston engine with several cylinders arranged about a primary axis having a connecting rod arrangement according to the present invention disposed therein.

Referring now to the drawings wherein like reference numerals are used throughout the various views to designate like parts and, more particularly, to FIG. 1, according to this figure, a tubular or pipe section generally designated by the reference character T is provided which represents a starting material for a connecting rod shaft 1. The tubular section or pipe T is advantageously constructed of a sheet metal material having a uniform thickness with the sheet metal material being joined along a longitudinal seam by a welding joint (not shown). The tubular section or pipe T is formed by a repeated cold drawing operation. The right-hand end 101 of the tubular section or pipe T is narrowed or reduced in diameter by pressing the end 101 into a draw ring 2 provided with a conical bore 2' so as to form a compressed tubular shaft 3. The right-hand end 101 receives a connecting rod big end spherical shell 7 (FIG. 3b) with the left-hand end 101' of the tubular section or pipe T receiving a spherical shell 9 (FIG. 4b) on the piston side.

As shown in FIG. 2, the compressed tubular shaft 3 is placed in a collet 4 of a lathe (not shown) and obliquely bored or cut at the ends 101, 101' by a turning tool 102 to such an extent that an annular edge 105 of each end 101, 101' of the compressed tubular shaft 3, prior to a welding process, rests pointedly on an outer surface of the end shells 7, 9 or 7a, 9a, respectively (FIG. 5), whereby a clean welding joint is achieved.

To form the connecting rod big end spherical shell 7, as shown in FIGS. 3 and 3a, a die D is provided on which is arranged a punched sheet metal disk 5 provided with a centrally disposed aperture 5' adapted to receive a centering pin 6. After the metal disk 5 is drawn to form the spherical shell 7, the shell 7 is subsequently machined or shaped at the peripheral edges thereof, in a manner described in more detail hereinbelow, so as to cut off or square off the edges thereof, thereby resulting in a spherical shell 7a shown in FIG. 3c.

As shown most clearly in FIGS. 4a, 4b, to form the hollow spherical shell 9, a punched sheet metal disk 8 is arranged on a die D₁ with the disk 8 being provided with a centrally disposed aperture 8' adapted to receive a centering pin 6. After the metal disk 8 is drawn to form the spherical shell 9, the shell 9 is subsequently machined or shaped at the peripheral edges thereof, in a manner described more fully hereinbelow, so as to cut off or square off the edges thereof, thereby resulting in a spherical shell 9a shown in FIG. 4c.

FIG. 5 provides an example of a welding arrangement for the connecting rod of the present invention. Specifically, an electrically conductive housing or casing member generally designated by the reference character H is provided in which is arranged centering or mounting members 12, 13, 14. The spherical shell 7a is arranged on the member 13 and the compressed tubular shaft 3 is arranged in the centering member 12 with the annular edge 105 resting against the outer surface of the shell 7a. The shell 9a is arranged on the annular edge 105 of the other end of the compressed tubular shaft 3 with the member 14 maintaining the shell 9a in a centered position. A lubricating tube 11 is arranged between the shells 7a, 9a and is held centrally with respect to the shells 7a, 9a and the tubular shaft 3 by the centering member 12 and/or by a pin 10 of a hard electrically oxidized aluminum wire. The pin 10 may also be formed of a lacquered steel wire, if desired. With the tubular shaft 3, shells 7a, 9a, and lubricating tube 11 in the assembled condition, the welding operation is carried out in a conventional manner so as to result in the formation of a one-piece connecting rod.

When using hardenable alloys, the welded together connecting rod can be provided with hardened operating surfaces by a long-term heat treatment. However, during this hardening step, a certain warpage can occur. Therefore, it is advantageous to separately harden the hardenable hollow spherical shells 7, 9 or 7a, 9a in a steel compression mold having exact spherical surfaces under pressure fixation of the mold and to effect the welding step thereafter. This is possible particularly in conjunction with a capacitor discharge welding process because, in such process, the workpieces can remain practically in a cold state outside of the welding areas.

It is also possible in accordance with the present invention to utilize a plate steel and to provide the same with a thin metallic layer of material suitable for bearing purposes or, at least, to weld or solder such material to the plate steel at individual bearing places.

Additionally, before joining of pre-treated, hardened components by subsequent welding and also in case of any treatment to include the welding bond, according to the present invention, to improve the supporting internal surfaces of the connecting rod shell, the shell is lapped with the aid of a ball moving about an axis inclined with respect to the axis of the connecting rod so that the internal surfaces have a better spherical shape and are of an exact radial dimension.

In the last-mentioned case, it is advantageous according to the present invention, especially in connection with axial cylinder-type engines with a transmission of traction forces by the connecting rod during operation, to also machine the external surfaces of the hollow spherical shells 7, 9 or 7a, 9a to a uniformly supportive spherical configuration.

FIG. 6 provides an example of an arrangement for machining a connecting rod body after the same has been assembled and joined, for example, in the manner indicated in FIG. 5. In particular, as shown in FIG. 6, an assembled connecting rod body generally designated by the reference numeral 18 having shells 107, 109 welded at respective ends thereof is arranged between two rotating work holding members or pins 16, 17 arranged on a bed 15 of a lathe (not shown) with each of the members or pins 16, 17 having a spherical outer surface corresponding respectively to the inner surface 207, 209 of the shells 107, 109. The work holding members or pins 16, 17 set the connecting rod body 18 into rotation under an appropriate pressure in an accurate position so that not only can a cutting operation by turning or cutting tools 19, 20, and a grinding operation by grinding disk 21 be effected, but also a rolling lapping machining step by a lapping disk 22 can be effected. To provide for an automatic feed to permit insertion and removal of the connecting rod body 18, appropriate gripping means generally designated by the reference character G can be provided for gripping the connecting rod body 18 at the cylindrical portion thereof.

To carry out the grinding operation, it is advantageous to employ a cup-shaped grinding wheel 21 with a narrow edge which adapts itself to the desired spherical shape of the shells 107, 109.

For an operation in an axial cylinder-type reciprocating piston engine without changing load, that is, an engine in which the connecting rod bodies 18 are only under compressive stress, the radii of curvature of the hollow spherical shells 9, 9a, 109 in the piston should be larger than the supporting spherical surfaces there in the piston and/or in the connecting rod ring, whereby it is then possible for a wedge-shaped fine film of lubricant to form between the spherical surfaces in the manner of a bearing Mitchell.

Consequently, the connecting rod arrangement manufactured in accordance with the present invention is especially suitable for axial cylinder-type reciprocating engines having a two-stroke operation.

FIG. 7 provides an example of the connecting rod body 18 arranged in an axial cylinder-type reciprocating piston engine. The connecting rod body 18 has a relatively large connecting rod big end shell 7a and such construction is advantageous for an engine with changing loads being exerted on the connecting rod and, for this purpose, in the illustrated construction, the external bearing ring 23 of the connecting rod shell 7a is divided along a longitudinal section 123 through the axis thereof, as shown most clearly in FIGS. 9, 9a, 9b and 10.

As shown in FIG. 7, the divided bearing ring 23 is arranged at the outer surface of the shell 7a and is clamped in place in a wobble ring 25 by a threaded ring 24. The spherical shell 7a rests on or is in bearing contact with a cup or spherical shaped member 35 having a spherical inner bearing surface 135. The spherical shell 9a is in bearing contact with a further cup or spherical shaped member 27 provided at the piston 26. The spherical shell 9a is disposed between the member 27 and a spherical bearing ring 28 mounted at the piston 26 by a spring ring 29. The spherical surfaces 135, 127, 223, 228, as well as, for example, the spherical surfaces 207, 209, 107, 109, have slightly differing radii of curvature so as to form wedge-shaped lubricant grooves thereat.

The upper external bearing ring 28 and the threaded ring 24 must permit passage of the connecting rod big end shell 7a but the shell 7a, due to a division in diameter, can be substantially larger than the smallest inner width of the split ring 23 so that, due to the division, the supporting surface of the ring when the connecting rod is under traction is furthermore enlarged radially on the inside.

The connecting rod 18 is suitably mounted in the vertical position of the wobble ring or disk 25 with respect to the axis where the threaded ring 24 can also be twisted into position while at right angles with respect to the primary axis.

As shown also in FIG. 7, in the piston 26, the cylinder cup-shaped bearing 27 is pressed in with a closed side of the bearing being fashioned externally as a spherical bearing surface. The spherical shell 9a at the connecting rod body 18 slides along the convex outer surface of the cup-shaped bearing 27. The spherical shell 9a, turned in a cylindrical form along its circumference, is held, while maintaining a bearing play, by the concentric spherical bearing ring 28 and the spring ring 29 within the piston 26.

As shown in FIG. 10, the threaded ring 24 is slipped over the connecting rod 18 and functions, as shown in FIG. 7, to hold the divided bearing ring 23 of the connecting rod at the spherical shell 7a. The threaded ring 24 is clamped firmly in the wobble ring or disk 25 joined to the shaft 30. The wobble ring or disk 25 is supported along its outer circumference within an inclined disk 31 with the aid of a bearing (not shown) so that a bevel gear 32 attached thereto meshes with a counter-gear 33 connected to the engine block 34 and is retained against rotation. The inclined disk 31 surrounds the wobble ring or disk 25; however, a bearing arrangement is provided which rotates together with the shaft 30 in the engine block 34.

Figure 11:
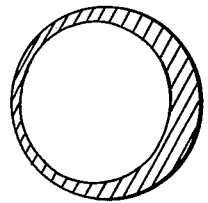
FIGS. 11 and 12 are auxiliary projections of supportive surfaces of inner and outer bearing surfaces, respectively, of the connecting rod arrangement in accordance with the present invention.
Figure 12:
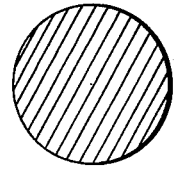

FIG. 11 provides an example of a projection of a surface of the outer bearing ring 23 which is supportive in case of a traction load on the outer spherical surface of the connecting rod big end shell 7a, with FIG. 12, in contrast thereto, illustrating a projection of an inner supporting surface of the connecting rod big end shell 7a which is effective in case of a pressure on the connecting rod on the spherical pin 35 in the wobble ring or disk 25 in the same manner.

While I have shown and described several embodiments in accordance with the present invention, it is understood that the same is not limited thereto, but is susceptible of numerous changes and modifications as known to those skilled in the art, and I therefor do not wish to be restricted to the details shown and described herein, but intend to cover all such changes and modifications as are encompassed by the scope of the appended claims.

I claim:

1. A connecting rod for an axial cylinder-type reciprocating piston engine which includes a wobble ring, a first spherical bearing means provided at the wobble ring, and a second spherical bearing means provided at the piston of the engine, characterized in that a sheet metal tubular shaft is provided, hollow sheet metal spherical shells are welded at respective ends of said tubular shaft, each of said hollow spherical shells including inner and outer spherical surfaces, the inner spherical surfaces extend radially outwardly with respect to a longitudinal axis of the tubular shaft beyond the respective ends of the tubular shaft and are adapted to respectively cooperate with the first and second bearing means, a pair of retaining ring means are provided for releasably connecting the respective spherical shells to the piston and wobble ring, and in that each of said retaining ring means includes spherical surfaces cooperable with the respective outer spherical surfaces of the hollow spherical shells.

2. A connecting rod according to claim 1, characterized in that the tubular shaft is reduced in diameter at one end thereof.

3. A connecting rod according to claim 2, characterized in that a lubricating tube is arranged, oil-tight, within said tubular shaft and extends between said spherical shells so as to equalize a quantity of a lubricant between surfaces of the hollow spherical shells.

4. A connecting rod according to claim 3, characterized in that cooperating spherical surfaces of the bearing means and said hollow spherical shells which slide along each other have slightly differing radii of curvature so as to form wedge-shaped lubricant grooves.

5. A connecting rod according to claim 4, characterized in that working surface portions are provided on the connecting rod, and in that said working surface portions are temper-hardened.

6. A connecting rod according to claim 5, characterized in that the working surface portions are provided with wear-proof hard metal layers.

7. A connecting rod according to claim 5, characterized in that the working surface portions are provided with a chromium-like material.

8. A connecting rod according to claim 5, characterized in that the working surface portions are provided with a coating of non-porous ductile chromium.

9. A connecting rod according to claim 1, characterized in that a lubricating tube is arranged, oil-tight, within said tubular shaft and extends between said spherical shells so as to equalize a quantity of a lubricant between surfaces of the hollow spherical shells.

10. A connecting rod according to claim 1, characterized in that cooperating spherical surfaces of the bearing means and said spherical shells which slide along each other have slightly differing radii of curvature so as to form wedge-shaped lubricant grooves.

11. A connecting rod according to claim 1, characterized in that working surface portions are provided on the connecting rod, and in that said working surface portions are temper-hardened.

12. A connecting rod according to claim 11, characterized in that the working surface portions are provided with wear-proof hard metal layers.

13. A connecting rod according to claim 11, characterized in that the working surface portions are provided with a chromium-like material.

14. A connecting rod according to claim 11, characterized in that the working surface portions are provided with a coating of non-porous ductile chromium.

* * * * *